United States Patent
Schumacher et al.

(10) Patent No.: US 11,012,195 B2
(45) Date of Patent: May 18, 2021

(54) METHOD, SENSOR, AND CONTROLLER FOR TRANSMITTING A DATA PACKET FROM A SENSOR TO A CONTROLLER

(71) Applicant: Robert Bosch GmbH, Stuttgart (DE)

(72) Inventors: Hartmut Schumacher, Freiberg (DE); Guenter Weiss, Walheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/326,121

(22) PCT Filed: Jul. 6, 2017

(86) PCT No.: PCT/EP2017/066895
§ 371 (c)(1),
(2) Date: Feb. 15, 2019

(87) PCT Pub. No.: WO2018/033294
PCT Pub. Date: Feb. 22, 2018

(65) Prior Publication Data
US 2019/0222355 A1    Jul. 18, 2019

(30) Foreign Application Priority Data
Aug. 19, 2016    (DE) .................... 10 2016 215 640.3

(51) Int. Cl.
*H04L 1/08*    (2006.01)
*H04L 29/08*   (2006.01)
(Continued)

(52) U.S. Cl.
CPC .............. *H04L 1/08* (2013.01); *H04L 1/0027* (2013.01); *H04L 7/0008* (2013.01); *H04L 67/12* (2013.01)

(58) Field of Classification Search
CPC .......... H04L 1/08; H04L 1/0027; H04L 67/12
See application file for complete search history.

(56) References Cited

U.S. PATENT DOCUMENTS 6,314,269 B1 * 11/2001 Hart .................... H04B 7/18534
455/12.1
6,731,619 B1 * 5/2004 Ramesh ............... H04B 7/0604
370/334
(Continued)

FOREIGN PATENT DOCUMENTS

DE     198 57 154 C1      3/2000
DE    10 2015 206 380 A1   10/2015
(Continued)

OTHER PUBLICATIONS

International Search Report corresponding to PCT Application No. PCT/EP2017/066895, dated Oct. 18, 2017 (German and English language document) (5 pages).

*Primary Examiner* — Steve N Nguyen
(74) *Attorney, Agent, or Firm* — Maginot, Moore & Beck LLP

(57) ABSTRACT

A method for transmitting a data packet from a sensor to a controller via a peripheral sensor interface includes transmitting the data packet from the sensor via the sensor interface in a time window of a transmission period of a sensor interface operating mode which is synchronized by the controller. The data packet is re-transmitted by the sensor within the transmission period in at least one additional time window of the transmission period.

9 Claims, 2 Drawing Sheets

(51) Int. Cl.
*H04L 1/00* (2006.01)
*H04L 7/00* (2006.01)

(56) References Cited

U.S. PATENT DOCUMENTS

| | | | | |
|---|---|---|---|---|
| 9,450,691 | B2* | 9/2016 | Stahlin | H04J 3/0638 |
| 2003/0073464 | A1* | 4/2003 | Giannakis | H04L 1/0618 |
| | | | | 455/562.1 |
| 2003/0133520 | A1* | 7/2003 | Jayaraman | H04B 1/712 |
| | | | | 375/340 |
| 2003/0189899 | A1* | 10/2003 | Spiess | H02H 3/05 |
| | | | | 370/227 |
| 2006/0045063 | A1* | 3/2006 | Stanford | H04B 7/2643 |
| | | | | 370/345 |
| 2007/0076680 | A1* | 4/2007 | Amram | H04L 1/0083 |
| | | | | 370/349 |
| 2008/0107044 | A1* | 5/2008 | Blair | H04L 45/10 |
| | | | | 370/256 |
| 2009/0310571 | A1* | 12/2009 | Matischek | H04W 72/0406 |
| | | | | 370/336 |
| 2012/0269253 | A1* | 10/2012 | Daecke | H04B 3/14 |
| | | | | 375/232 |
| 2014/0081526 | A1* | 3/2014 | Rapp | B60R 21/013 |
| | | | | 701/45 |
| 2014/0241414 | A1* | 8/2014 | Reidl | H04L 25/4902 |
| | | | | 375/238 |
| 2015/0244632 | A1* | 8/2015 | Katar | H04L 47/2433 |
| | | | | 370/230 |
| 2016/0241404 | A1 | 8/2016 | Shokrollahi et al. | |
| 2019/0098625 | A1* | 3/2019 | Johnson | H04B 7/0697 |

FOREIGN PATENT DOCUMENTS

| | | |
|---|---|---|
| DE | 10 2014 113 162 A1 | 3/2016 |
| JP | H09-266493 A | 10/1997 |
| JP | H11-177590 A | 7/1999 |

\* cited by examiner

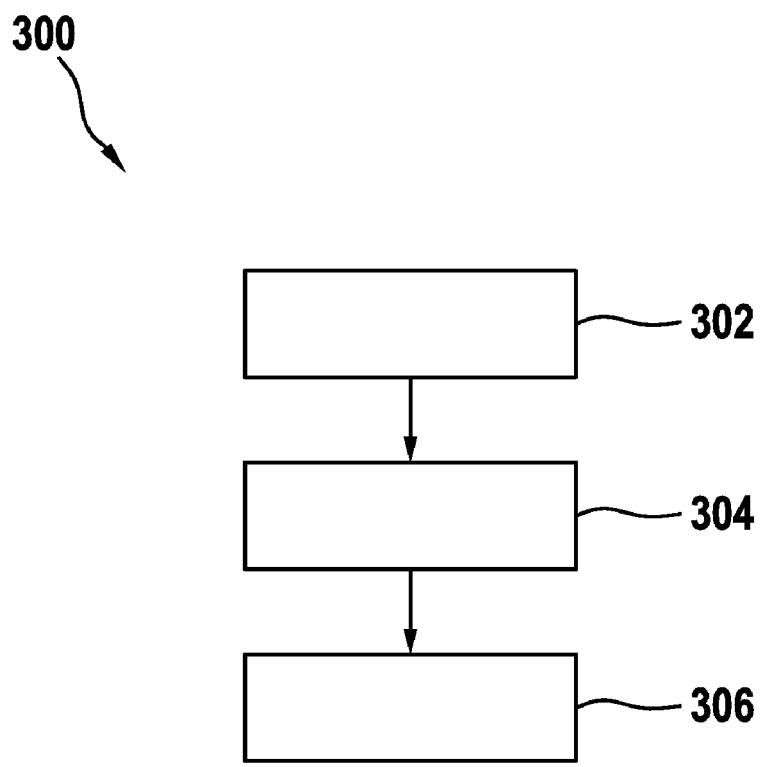

METHOD, SENSOR, AND CONTROLLER FOR TRANSMITTING A DATA PACKET FROM A SENSOR TO A CONTROLLER

This application is a 35 U.S.C. § 371 National Stage Application of PCT/EP2017/066895, filed on Jul. 6, 2017, which claims the benefit of priority to Serial No. DE 10 2016 215 640.3, filed on Aug. 19, 2016 in Germany, the disclosures of which are incorporated herein by reference in their entirety.

BACKGROUND

The disclosure is based on a control unit or a method. The subject matter of the present disclosure is also a computer program.

Electromagnetic interference can affect a data transmission over an unshielded cable. If a data packet is affected by interference, the data packet can be requested again. This requires a large amount of communication time, however, during which no further data packets can be transmitted.

SUMMARY

Against this background, the approach presented here proposes a method for transmitting a data packet from a sensor to a control unit, and also proposes a sensor and a control unit that use this method, and also lastly proposes a corresponding computer program. Advantageous developments and improvements of the control unit are possible by the measures mentioned in the dependent claims.

In order to transmit a data packet correctly with a high probability at least once, the data packet can be sent repeatedly in succession, in order that a data packet affected by interference can be discarded. In particular for a Peripheral Sensor Interface 5 (PSI5), which is suitable for transmitting the data packets from a plurality of sensors, in the case that a single sensor is connected, the excess communication capacity of the sensor interface can be used to transmit data packets redundantly without causing time to be lost by additional requests from the control unit.

A method is presented for transmitting a data packet from a sensor to a control unit via a Peripheral Sensor Interface 5 (PSI5), wherein, in a sending step, in an operating mode of the sensor interface, which operating mode is synchronized by the control unit, the sensor sends the data packet via the sensor interface in a time slot of a transmission period of the operating mode, and the sensor resends the data packet within the transmission period in at least one further time slot of the transmission period.

A peripheral sensor interface can refer to an interface for connecting a sensor to a control unit using a two-wire electrical line. The Peripheral Sensor Interface 5 has a robust communication protocol. The control unit can influence an operating mode. The operating mode may be asynchronous or synchronous. In the synchronous operating mode, the control unit can provide synchronization signals for timing or synchronizing the transmission. A synchronization signal can define a start of a transmission period. The transmission period comprises a plurality of successive time slots. The communication protocol can define a length of the transmission period. Likewise, the communication protocol can define how many time slots are within a transmission period. A time slot can be a time segment within the transmission period that is suitable for transmitting a data packet.

The method can comprise a receiving step, in which the control unit receives in the time slot the data packet via the peripheral sensor interface, and the control unit receives in the at least one further time slot the data packet again. The transmitting can comprise the sending and the receiving. Sending and receiving are performed at units that are spatially separate from one another.

The method can comprise a verification step, in which the data packet received in the time slot and the data packet received in the further time slot are compared with one another. In the verification, it is possible to detect interference in the transmission. If a difference is ascertained in the comparison of the data packets, it is certain that one of the data packets has been affected by interference during transmission. The data packets themselves can comprise verification information such as a checksum, for instance. By means of the comparison and the verification information, it is possible with high probability to select for further use the data packet unaffected by interference.

In the sending step, within the transmission period, the data packet can be sent again in an unoccupied time slot of the transmission period. The redundancy of the transmission can be increased by sending the same data packet in the unoccupied time slot of a transmission period. In particular for an environment of high interference, the information contained in the data packet can be transmitted reliably with high probability.

In the sending step, a further data packet can be sent via the peripheral sensor interface in an additional time slot of the transmission period, which additional time slot is located between the time slot and the further time slot. Within the transmission period, the further data packet can be re-sent in a time slot of the transmission period, which time slot follows the further time slot. If two different data packets are meant to be transmitted, the data packets can be sent alternately. It is also possible in this case to use further unoccupied time slots of the transmission period for sending the data packets.

In the receiving step, the further data packet can be received in the additional time slot. The further data packet can be received again in the time slot that follows the further time slot. During the receiving, it is possible to distinguish between the data packets. The different data packets can be stored in different registers.

In the verification step, the further data packet received in the additional time slot, and the further data packet received in the time slot that follows the further time slot, can be compared with one another. The verification can be performed for the further data packets in order to detect interference in the transmission also for the further data packets.

This method may be implemented, for example, in software or hardware or as a hybrid composed of software and hardware, for example in a control unit.

In addition, a sensor is presented for transmitting a data packet to a control unit via a Peripheral Sensor Interface 5 (PSI5), which sensor comprises a sending device which is designed to send, in an operating mode of the sensor interface, which operating mode is synchronized by the control unit, the data packet in a time slot of a transmission period of the operating mode, and within the transmission period, to resend the data packet in at least one further time slot of the transmission period.

In addition, a control unit is presented for operating a Peripheral Sensor Interface 5 (PSI5), which control unit comprises a receiving device which is designed to receive via the sensor interface, in an operating mode of the sensor interface, which operating mode is synchronized by the control unit, a data packet in a time slot of a transmission period of the operating mode, and to receive the data packet again via the sensor interface in at least one further time slot of the transmission period.

For this purpose, the control unit can comprise at least one processing unit for processing signals or data, at least one storage unit for storing signals or data, at least one interface to a sensor or to an actuator for reading sensor signals from the sensor or for outputting control signals to the actuator, and/or at least one communication interface for reading or outputting data embedded in a communication protocol. The processing unit may be a signal processor, a microcontroller, or the like, for example, and the storage unit may be a flash memory, an EEPROM or a magnetic storage unit. The communication interface can be designed to read or output data by wireless and/or wired means, wherein a communication interface that can read or output wired data, can read this data from a corresponding data transmission line or output this data into a corresponding data transmission line electrically or optically, for example.

A control unit can be understood to mean here an electrical device that processes sensor signals and, on the basis thereof, outputs control signals and/or data signals. The control unit can comprise an interface, which can be in the form of hardware and/or software. When in the form of hardware, the interfaces can be part of what is known as a system ASIC, for example, which contains a variety of functions of the control unit. It is also possible, however, that the interfaces are dedicated integrated circuits or, at least in part, consist of discrete components. When in the form of software, the interfaces can be software modules, which are present, for example, in addition to other software modules on a microcontroller.

Also advantageous is a computer program product or computer program comprising program code, which can be stored on a machine-readable medium or storage medium such as a semiconductor memory, a hard disk memory or an optical memory, and is used to perform, implement and/or control the steps of the method according to one of the embodiments described above, in particular when the program product or program is executed on a computer or a device.

BRIEF DESCRIPTION OF THE DRAWINGS

Exemplary embodiments of the approach presented here are explained in more detail in the following description, and are illustrated in the drawings, in which:

FIG. 3 is a flow diagram of a method for transmitting a data packet according to an exemplary embodiment.

DETAILED DESCRIPTION

The following description of advantageous exemplary embodiments of the disclosure uses the same or similar reference signs for those elements of similar action that are shown in the various figures, and does not repeat a description of these elements.

Figure 1:
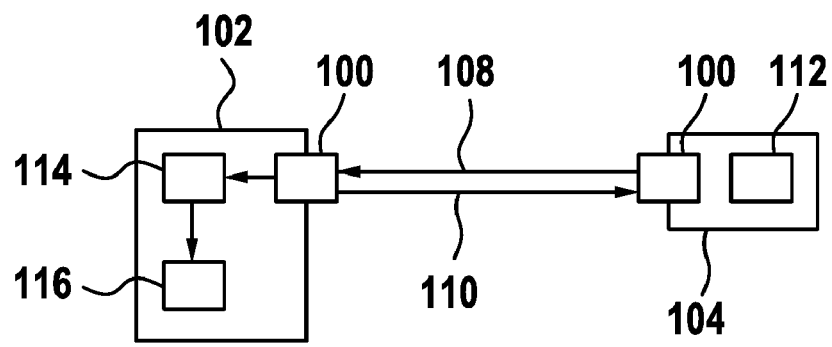
FIG. 1 is a block diagram of a sensor connected via a Peripheral Sensor Interface 5 to a control unit according to an exemplary embodiment.

FIG. 1 shows a block diagram of a sensor 104 connected via a Peripheral Sensor Interface 5 (PSI5) 100 to a control unit 102 according to an exemplary embodiment. The PSI5 interface 100 allows the sensor 104 to communicate with the control unit 102 via a two-wire line 106. For this purpose, the control unit 102 and the sensor 104 each comprise a PSI5 interface 100. The interface 100 has a communication protocol that provides three modes, or more precisely operating modes.

In an asynchronous mode, the control unit 102 is permanently ready to receive, and communication takes place via the interface 100 from the sensor 104 to the control unit 102 when the sensor has a data packet 108 to transfer.

In a synchronous mode, the control unit 102 uses a synchronization signal 110 to synchronize the communication via the line 106. A transmission period starts in response to the synchronization signal 110. Within the transmission period, the sensor 104 sends its data packet 108 during a time slot assigned to said sensor. The synchronized communication allows a plurality of sensors 104 to be operated via the same interface 100, because each sensor 104 can be assigned a dedicated time slot within the transmission period.

In the safeguarded mode presented here, the communication is again synchronized by the control unit 102 by means of the synchronization signal 110. Like the case for the asynchronous mode, however, only one sensor 104 is connected to the control unit 102 via the interface 100. In the safeguarded mode, the sensor 104 sends the data packet 108 repeatedly in a plurality of time slots of the transmission period.

For this purpose, the sensor 104 comprises a sending device 112 which is designed to send, in the safeguarded operating mode, the data packet 108 in a first time slot of the transmission period and in at least one subsequent, second time slot of the transmission period via the PSI5 interface 100.

The control unit 102 comprises a receiving device 114 which is designed to receive, in the safeguarded operating mode, the data packet 108 in the first time slot of the transmission period, and to receive the data packet 108 in the at least one subsequent, second time slot of the transmission period again via the PSI5 interface 100.

In one exemplary embodiment, the control unit 102 comprises a verification device 116. The verification device 116 is designed to compare the data packet 108 received in the first time slot with the data packet 108 received in the second time slot. In the comparison, it is possible to ascertain interference in one of the time slots.

The data packets 108 can be verified individually by means of error checking mechanisms. If, in combining the verifications, one of the data packets 108 is identified as corrupted, and the other data packet 108 is identified as error-free, the corrupted data packet 108 can be discarded, and the error-free data packet 108 can continue to be used.

Figure 2:
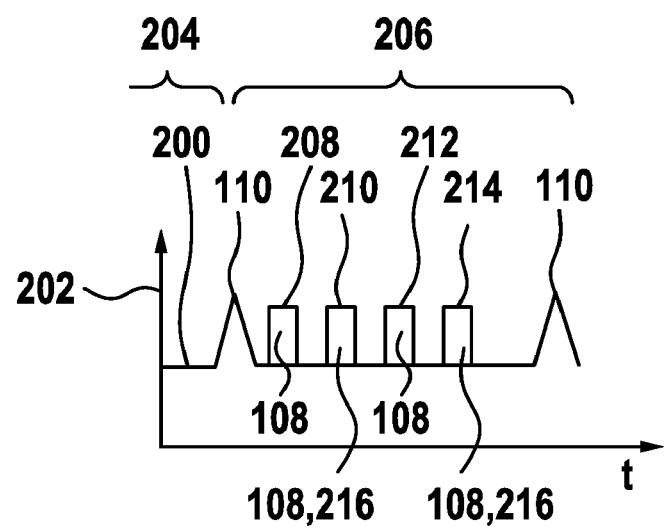
FIG. 2 depicts a transmission of data packets according to an exemplary embodiment.

FIG. 2 depicts a transmission of data packets 108 according to an exemplary embodiment. The transmission is depicted using a time waveform 200 of an electrical variable 202 of a PSI5 line such as that shown by way of example in FIG. 1. The waveform 200 is plotted in a graph, in which the abscissa gives the time t and the ordinate gives the electrical variable 202. The electrical variable 202 may be a current flow or a voltage, for example. In the safeguarded mode, the waveform 200 is divided by synchronization signals 110 into transmission periods 204, 206. In this exemplary embodiment, a synchronization signal 110 is followed by a sequence of four time slots 208, 210, 212, 214, which are defined by the PSI5 standard, within a transmission period 206.

In one exemplary embodiment, the same data packet 108 is transmitted redundantly in each time slot 208, 210, 212, 214; thus in this case with four-times redundancy.

In one exemplary embodiment, the first data packet 108 is transmitted in the first time slot 208. In the second time slot 210, a second data packet 216 is transmitted. The first data packet 108 is retransmitted in the third time slot 212, and the second data packet 216 is retransmitted in the fourth time slot 214. Thus both the first data packet 108 and the second data packet 216 are transmitted twice and hence redundantly.

Time-slot redundancy is presented as a means of increasing the robustness of a PSI5 transmission. An increase in the EMC robustness of PSI5 interfaces can be achieved by the approach presented here.

The PSI5 interface standard allows the digital transmission of sensor data to a control unit (CU) in an asynchronous mode and in a synchronous mode. In the asynchronous mode, the sensor defines the time at which a data packet is sent. Only one sensor can be connected to a control unit for each PSI5 interface. In the synchronous mode, the sensor unit(s) are synchronized by the control unit. It is thereby possible for a plurality of sensors to transmit their data to the control unit via a common PSI5 interface by means of separate time slots 208, 210, 212, 214. The synchronous mode can be referred to as a bus mode. The sensor interface is thereby used more efficiently, which can result in a reduction in the number of PSI5 interfaces needed in a control unit.

A fault in the PSI5 line, for example a short circuit, can affect all the connected sensors, however. Therefore some users only ever connect just one sensor to a synchronous PSI5 interface, and operate the PSI5 interfaces in point-to-point mode (P2P). A plurality of time slots 210, 212, 214 remain unused.

Unused time slots 210, 212, 214 in a synchronous point-to-point transmission can be used to increase the interference immunity of the transmission. This is done by transmitting the data packet 108 from the sensor not just in the designated time slot 208 but in at least one further time slot 210, 212 214.

For interference that affects only one time slot 208, 210, 212, 214, for instance for burst interference, interference-free transmission can take place in the time slot 208, 210, 212, 214 that is unaffected by interference. Transmitting the data 108 in all the unoccupied time slots 208, 210, 212, 214 provides maximum interference immunity. Thus in the 125 kB mode, it is possible to transmit the data 108 from a sensor three times.

In the case of a sensor that occupies two time slots 208, 210, for instance a two-channel sensor, the 189 kB mode with its four time slots 208, 210, 112, 214 offers dual data transmission.

In the approach presented here, external sensors for synchronous point-to-point operation are equipped with a new redundancy mode (R-mode). This can be permanently programmed (NVM) by the manufacturer at the end of production before shipping, or defined by means of the airbag control unit in the initialization phase in every power-on cycle. As a result of this R-mode being selected, the obtained sensor data 108 is repeated in the unoccupied time slots 210, 212, 214 of the PSI5 standard. This increases the availability and performance of the system because in the event of burst interference, the data packet 108 affected by interference is identified as corrupted or missing, and thus is not used for crash discrimination. The data packet 108 unaffected by interference and sent in the further time slot 210, 212, 214 can be used for crash discrimination. The increased availability of the sensor data has a particularly positive effect on occupant protection for side crashes, because side crashes require very rapid crash detection.

For synchronous PSI5 interfaces being operated in point-to-point mode, the approach presented here increases robustness to radiated interference. In addition, it improves the availability of the sensor data in the control unit.

No additional hardware requirements arise for the control unit. The additional requirements for the sensor are low and are confined to the digital part.

In the control unit, the repeatedly transmitted data 108 can be verified additionally by data comparison for assessing transmission errors. This increases the certainty of receiving correct data 108.

In the approach presented here, data transmission is repeated in different time slots 208, 210, 212, 214. A functional test is possible by a current-clamp measurement on the PSI5 line.

FIG. 3 shows a flow diagram of a method 300 for transmitting a data packet according to an exemplary embodiment. The method 300 can be performed in a sensor such as that shown by way of example in FIG. 1, in order to transmit the data packet via a Peripheral Sensor Interface 5 (PSI5) to a control unit. The method 300 comprises a sending step 302. In the sending step 302, in an operating mode of the sensor interface, which operating mode is synchronized by the control unit, the sensor sends the data packet via the sensor interface in a time slot of a transmission period of the operating mode. The sensor resends the data packet within the transmission period in at least one further time slot of the transmission period.

In one exemplary embodiment, the method comprises a receiving step 304. The receiving step can be performed in a control unit such as that shown by way of example in FIG. 1. In the receiving step 304, the control unit receives in the time slot the data packet via the peripheral sensor interface. The control unit receives in the at least one further time slot the data packet again.

In one exemplary embodiment, in a verification step 306, the data packet received in the time slot and the data packet received in the further time slot are compared with one another. Since the data packets are meant to be identical, any interference in the transmission can be detected by the comparison.

If an exemplary embodiment includes an "and/or" conjunction between a first feature and a second feature, then this shall be interpreted to mean that the exemplary embodiment comprises, according to one embodiment, both the first feature and the second feature, and, according to another embodiment, comprises either only the first feature or only the second feature.

The invention claimed is:

1. A method for transmitting data packets from a sensor to a control unit via a peripheral sensor interface, the peripheral sensor interface having a first synchronous operating mode and a second synchronous operating mode, a transmission period and a plurality of successive time slots of the transmission period being synchronized by the control unit in both the first synchronous operating mode and the second synchronous operating mode, a start of the transmission period being defined by a synchronization signal provided by the control unit, all of a plurality of sensors being connected to the control unit via the peripheral sensor interface in the first synchronous operating mode by allocating each sensor in the plurality of sensors its own time slot of the plurality of successive time slots within the transmission period, only one sensor of the plurality of sensors being connected to the control unit via the peripheral sensor interface in the second synchronous operating mode, the method comprising:

sending, in the second synchronous operating mode of the peripheral sensor interface, a first data packet with the one sensor via the peripheral sensor interface in a first time slot of the plurality of successive time slots within the transmission period;

receiving the first data packet with the control unit in the first time slot;

resending, in the second synchronous operating mode of the peripheral sensor interface, the first data packet with the one sensor in a second time slot of the plurality of successive time slots that follows the first time slot in time within the transmission period;

receiving again the first data packet with the control unit in the at least one second time slot; and performing a verification by comparing the first data packet received in the first time slot with the first data packet received again in the second time slot.

2. The method as claimed in claim 1, the resending the first data packet comprising:

resending, within the transmission period, the first data packet in an unoccupied time slot of the transmission period.

3. The method as claimed in claim 1 further comprising:

sending, in the second synchronous operating mode of the peripheral sensor interface, a second data packet with the one sensor via the peripheral sensor interface in a third time slot of the plurality of successive time slots within the transmission period that is located between the first time slot and the second time slot in time within the transmission period; and resending, in the second synchronous operating mode of the peripheral sensor interface, the second data packet with the one sensor via the peripheral sensor interface in a fourth time slot of the plurality of successive time slots within the transmission period that follows the second time slot in time within the transmission period.

4. The method as claimed in claim 3 further comprising:

receiving the second data packet with the control unit in the third time slot; and receiving again the second data packet with the control unit in the fourth time slot.

5. The method as claimed in claim 4, the performing the verification further comprising:

comparing the second data packet received in the third time slot with the second data packet received again in the fourth time slot.

6. The method as claimed in claim 1, wherein the method is implemented by a computer program stored on a non-transitory machine-readable storage medium.

7. The method as claimed in claim 1, wherein the peripheral sensor interface is configured as a Peripheral Sensor Interface 5.

8. A system comprising:

a control unit;

a plurality of sensors; and a peripheral sensor interface configured to transmit data packets from the plurality of sensors to the control unit, wherein the peripheral sensor interface has a first synchronous operating mode and a second synchronous operating mode, a transmission period and a plurality of successive time slots of the transmission period being synchronized by the control unit in both the first synchronous operating mode and the second synchronous operating mode, a start of the transmission period being defined by a synchronization signal provided by the control unit, all of the plurality of sensors being connected to the control unit via the peripheral sensor interface in the first synchronous operating mode by allocating each sensor in the plurality of sensors its own time slot of the plurality of successive time slots within the transmission period, only one sensor of the plurality of sensors being connected to the control unit via the peripheral sensor interface in the second synchronous operating mode, wherein, in the second synchronous operating mode of the peripheral sensor interface, the one sensor is configured to (i) send a first data packet via the peripheral sensor interface in a first time slot of the plurality of successive time slots within the transmission period and (ii) resend the first data packet with the one sensor in a second time slot of the plurality of successive time slots that follows the first time slot in time within the transmission period, and wherein the control unit is configured to (i) receive the first data packet with the control unit in the first time slot, (ii) receive again the first data packet with the control unit in the at least one second time slot, and (iii) perform a verification by comparing the first data packet received in the first time slot with the first data packet received again in the second time slot.

9. The system as claimed in claim 8, wherein the peripheral sensor interface is configured as a Peripheral Sensor Interface 5.

* * * * *